UNITED STATES PATENT OFFICE.

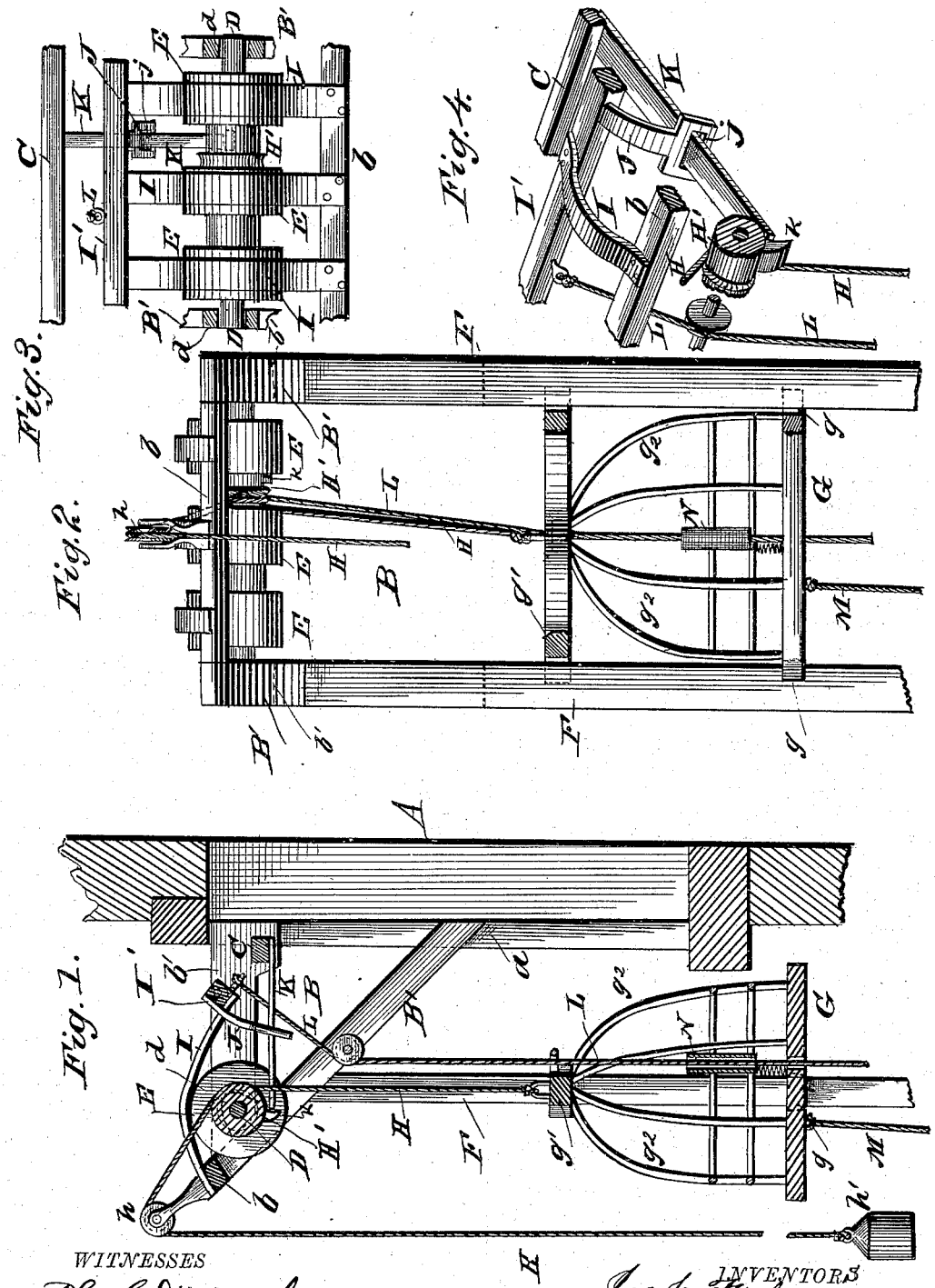

JACOB FISHER AND ALEXIS COQUILLARD, OF SOUTH BEND, INDIANA.

FIRE-ESCAPE.

SPECIFICATION forming part of Letters Patent No. 331,123, dated November 24, 1885.

Application filed May 12, 1885. Serial No. 165,206. (No model.)

*To all whom it may concern:*

Be it known that we, JACOB FISHER and ALEXIS COQUILLARD, of South Bend, in the county of St. Joseph and State of Indiana, have invented certain new and useful Improvements in Fire-Escapes; and we do hereby declare that the following is a full, clear, and exact description thereof, reference being had to the accompanying drawings, and to the letters of reference marked thereon, which form part of this specification, in which—

Figure 1 is a central vertical section through our improved fire-escape. Fig. 2 is a front elevation of the same. Fig. 3 is a detail of the brake mechanism. Fig. 4 is a perspective detail of the same.

The invention relates to the class of fire-escapes in which the person is let down by a rope controlled by brakes connected to a frame secured to the window; and it consists in the construction and novel arrangement of parts hereinafter described, and pointed out in the appended claims.

Referring to the accompanying drawings by letter, A designates a window some distance above the ground, of which $a\,a$ are the side beams or jambs of the frame.

B is a frame composed of the two inclined beams B' B', the transverse beam $b$, and the side beams, $b'\,b'$. The beams B' B' have their ends secured to the jamb $a$, preferably on their facing surfaces, and incline thence upward on the outer side of the window, having their upper ends united by the beam $b$. The beams $b'\,b'$ run horizontal from the jambs to the beams B' B' and stay the latter.

C is a beam secured transversely to the beams $b'\,b'$ and serving a purpose hereinafter explained.

D is a shaft journaled in brackets $d\,d$, secured to the beams B' a short distance below the top of the frame B.

E E are three collars on the said shaft, that serve as friction-collars, in a manner hereinafter explained.

F F are vertical guide-timbers that descend from the beams B' B' to the ground, and G is a cage that moves up and down between the guide-timbers by means of the notches $g$ in its base, which ride on the edges of the timbers.

$g'$ is a guide-bar secured to the top of the cage and bifurcated at its ends, to ride also on the edges of the guide-timbers. The bar $g'$ and base of the cage are united by the rods $g^2$, as shown.

H is a rope having one end secured to the center of the bar $g'$, and, passing thence upward, takes one or more turns around a brake-drum, H', on the shaft D, between two adjacent collars, E. Thence it passes over a pulley, $h$, secured to the beam $b$, and thence descends, having on its lower end a weight, $h'$, which is rather heavier than the cage, so as to make the latter ascend when empty.

I I are three curved spring brake bars or strips which have their outer ends secured to the beam $b$, their centers over but not binding on the collars E, and their inner ends secured to a transverse bar, I', which is otherwise unsupported.

J is a stirrup-bar secured to and depending from the bar I', and provided at its lower end with the rectangular slot $j$, as shown.

K is a detent-bar having its inner end secured to the beam C and passing through the slot $j$, and with its outer end in its normal position engaging against a detent, $k$, on the shaft D.

L is a rope secured by its upper end to the bar I', and passing thence downward through proper openings in the top and bottom of the cage to the ground, where it may have its lower end secured, preferably to a staple. If necessary, the rope L may pass over a pulley turning on a shaft standing transversely on the main frame.

M is a rope secured to the floor of the cage, and descending thence to the ground. By means of this rope a person on the ground may pull the cage down; but the weight $h'$ will cause it to ascend as soon as the rope is released. A person wishing to descend from the window steps into the cage and pulls on the rope L. A leather collar, N, surrounding and sliding on the rope within the cage, receives the grip, to prevent hurting the hand. The pull on the rope L draws down the bar I', and consequently releases the spring detent-bar K from the detent or lug $k$, and allows the shaft D to rotate. The weight of the person then causes the cage to descend, the pull on the rope L, by causing the spring brake-bars I to bear on the collars E, regulating the descent in the well-known usual manner.

It is obvious that the framing-timbers of the escape, as well as the cage and rope, may be constructed of suitable metal, and also that in many cases only one brake drum or collar, and consequently only one brake-spring, need be used.

Having described our invention, we claim—

1. In a fire-escape, the combination, with a cage traveling in vertical ways between the ground and a frame secured to the front of the window, and a shaft journaled upon said frame and provided with brake-collars and a brake-drum, of a rope rising from the cage, taking one or more turns around the brake-drum, and having on its end a weight slightly heavier than the cage, spring brake-bars secured to the frame, passing over the collars, and having their free ends secured to and supporting a bar, a slotted stirrup-piece secured to said bar, a spring detent-bar secured by one end to the frame, passing through the slot in the stirrup-piece and engaging by its other end against a detent on the shaft, and a rope attached at its upper end to the bar which the spring brake-bars support, passing through the cage, and adapted, when pulled upon, to release the spring detent-bar from the detent on the shaft, and cause the spring brake-bars to bind on the brake-collars, substantially as specified.

2. In a fire-escape, the combination of the frame B, secured to the window-frame and provided with the beam C, and the shaft D, journaled upon said frame and provided with the collars E, brake-drum H, and detent $k$, of the rope H, having the weight $h'$ attached, the curved spring brake-bars I, the bar I', secured to the free ends of said bars, the stirrup-bar J, the spring detent-bar K, and the ropes L and M, substantially as specified.

In testimony that we claim the foregoing as our own we affix our signatures in presence of two witnesses.

JACOB FISHER.
ALEXIS COQUILLARD.

Witnesses:
JAMES DU SHANE,
ANDREW ANDERSON.